(12) United States Patent
Fella et al.

(10) Patent No.: US 7,170,672 B2
(45) Date of Patent: Jan. 30, 2007

(54) RAMAN AMPLIFIER

(75) Inventors: Paolo Fella, Valvori (IT); Rodolfo Di Muro, Coventry (GB)

(73) Assignees: Marconi Communications S.p.A., Genoa (IT); Marconi Communications Limited, Conventry (GB)

( * ) Notice: Subject to any disclaimer, the term of this patent is extended or adjusted under 35 U.S.C. 154(b) by 0 days.

(21) Appl. No.: 10/529,822

(22) PCT Filed: Sep. 29, 2003

(86) PCT No.: PCT/GB03/04195

§ 371 (c)(1),
(2), (4) Date: Oct. 17, 2005

(87) PCT Pub. No.: WO2004/032383

PCT Pub. Date: Apr. 15, 2004

(65) Prior Publication Data

US 2006/0126158 A1 Jun. 15, 2006

(30) Foreign Application Priority Data

Oct. 2, 2002 (IT) .......................... MI2002A2079

(51) Int. Cl.
*H01S 3/00* (2006.01)
(52) U.S. Cl. .................. 359/334; 359/337.11
(58) Field of Classification Search ................. 359/334, 359/337.11
See application file for complete search history.

(56) References Cited

U.S. PATENT DOCUMENTS 6,624,926 B1 * 9/2003 Hayashi et al. ............. 359/334
6,690,504 B1 * 2/2004 Nagel et al. ................. 359/334
6,867,907 B1 * 3/2005 Inoue et al. ................. 359/334
6,958,856 B1 * 10/2005 Inoue et al. ................. 359/334
2002/0097480 A1 7/2002 Dominic et al.

FOREIGN PATENT DOCUMENTS

EP          1 182 808 A2    2/2002
WO       WO 02/17520 A1    2/2002

* cited by examiner

*Primary Examiner*—Mark Hellner
(74) *Attorney, Agent, or Firm*—Kirschstein, et al.

(57) ABSTRACT

A Raman amplifier for amplifying WDM radiation propagating along an optical fiber, the WDM radiation comprising a plurality of radiation components each having a selected waveband, comprises a plurality of optical radiation generators operable to generate pump radiation of a selected wavelength and power, the radiation being coupled into the fiber to optically amplify the WDM radiation. The generators are wavelength tuneable, and the power of the radiation components of the WDM radiation is measured after it has propagated along the fiber and has been amplified. The wavelength and power of operation of the generators are controlled in dependence upon the measured powers such as to make the measured powers substantially equal in magnitude and of a selected magnitude. To reduce polarization dependent gain where the pump radiation propagates in a direction along the optical fiber that is counter to the direction of propagation of the WDM radiation, each generator preferably comprises a plurality of radiation sources, preferably three, each one being operable to generate radiation having the same wavelength but with a different state of polarization. Advantageously, the three radiation sources are operable to generate radiation whose state of polarization is shifted by 60° to each other and which are combined using a polarization maintaining multiplexer.

11 Claims, 2 Drawing Sheets

RAMAN AMPLIFIER

Figure 1:
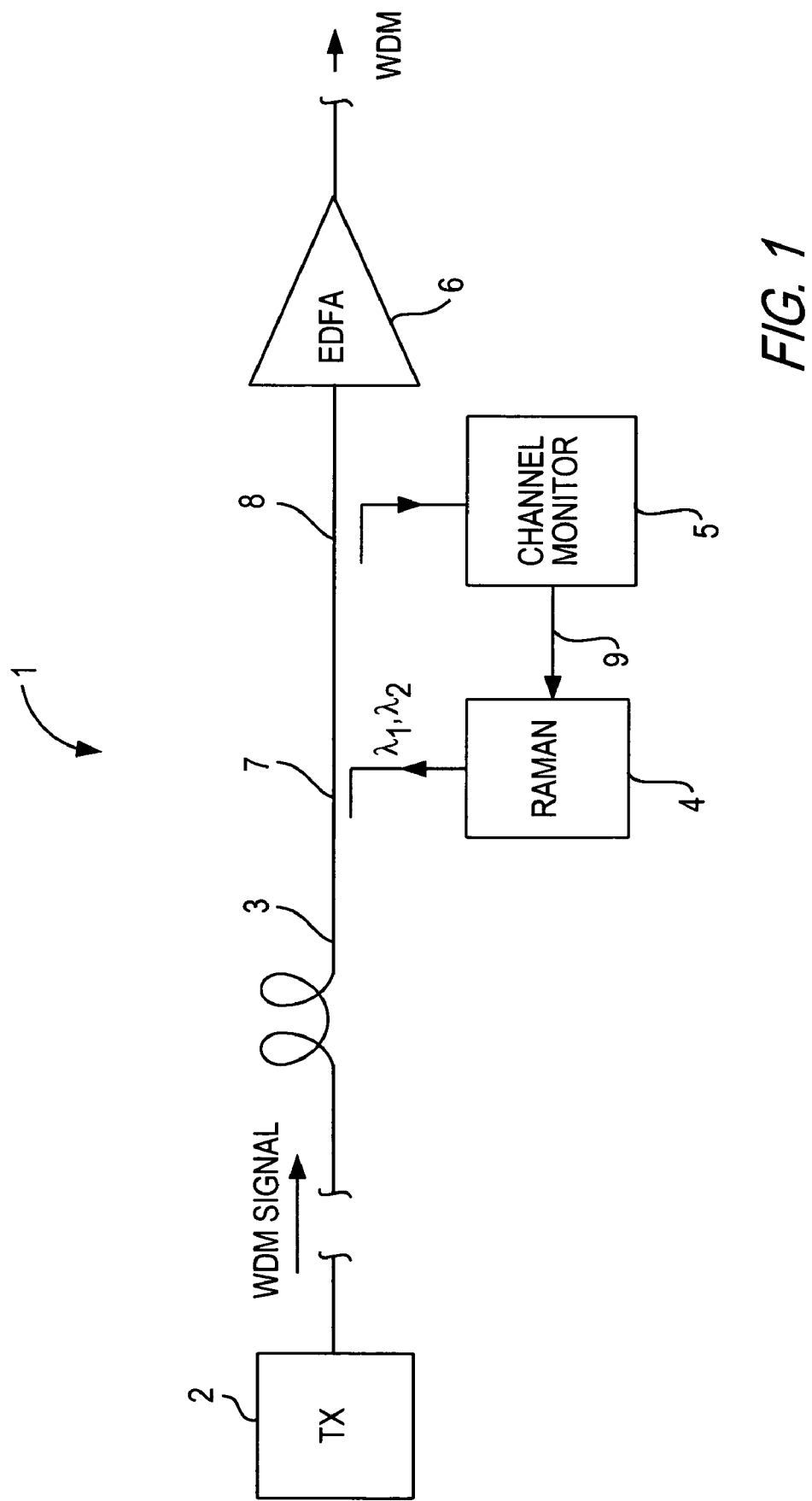

This invention relates to Raman amplifier for use in wavelength division multiplex (WDM) optical telecommunication systems.

As is known in WDM optical telecommunication systems, a plurality of communication traffic channels is conveyed between nodes by means of a plurality of optical carriers (channels) each having a discrete waveband (wavelength channel) and each of which has been modulated by a respective one of the communication channels. The plurality of modulated carriers (modulated radiation components), hereinafter termed WDM optical radiation, is guided between nodes by an optical fibre interconnecting the nodes.

Optical in the context of the present invention is defined as electromagnetic radiation having a free-space wavelength range of 560 nm to 2000 nm, though a free-space wavelength of substantially 1550 nm is a preferred part of this range.

To compensate for attenuation during transmission due to optical fibre loss, it is known to include optical amplification at various points, or at nodes, in the system to maintain the WDM radiation power level above a fixed value, to improve the optical signal-to-noise ratio (OSNR) and to enhance the communication range between nodes. For long haul (e.g. 800 km between transmit and receive nodes), extended long haul (e.g. 1600 km between transmit and receive nodes), and ultra long haul (2000+kms) communication links, distributed Raman optical amplifiers utilising Stimulated Raman Scattering (SRS) are preferred.

In essence distributed Raman optical amplifiers comprise a laser for optically pumping the optical transmission fibre with optical radiation having a fixed wavelength which is different to that of the WDM radiation it is intended to amplify. The pump radiation is usually introduced into the transmission fibre such that it propagates along the fibre in a direction that is counter to the direction of propagation of the WDM radiation. Such an arrangement reduces the transfer of relative intensity noise between the pump radiation and WDM radiation. It is however also known to optically pump the fibre from the transmit (launch) end such that the pump radiation co-propagates with the WDM radiation or to optically pump the fibre from both transmit and receive ends. Since optical amplification occurs along the length of the transmission fibre such amplifiers are often termed distributed Raman amplifiers. In contrast discrete Raman amplifiers include a separate length of optical fibre in which optical amplification takes place. Typically this fibre can have different chemical composition to enhance SRS.

As is known photons of the pump radiation are Rayleigh scattered by silicon atoms of the silica ($SiO_2$) optical fibre as they propagate along the fibre leading to the creation of a phonon (lattice vibration) and a photon which has lower energy (and frequency) to that of the colliding photon. Whilst the pump photons have a specific wavelength, the wavelength of the created photons are variously distributed over a bandwidth of about 6 THz (FWHM—Full Width Half Maximum). The created photons are frequency shifted (Raman shifted), and most of them have an average Raman shift of approximately 13 THz though this depends on the pump wavelength and decreases slightly with pump wavelength. The SRS (Stimulated Raman Scattering) created photons are able to amplify signals having the same frequency (i.e. over a bandwidth of 6 THz) by up to tens of dB of optical gain.

The distributed Raman amplifier has many advantages in WDM long and ultra long haul systems since it enhances the OSNR (optical signal-to-noise ratio) and lowers the launch power per WDM wavelength channel keeping any optical non-linearity to a minimum level. When used in combination with EDFAs (erbium doped fibre amplifiers), Raman amplification allows the fibre span length to be increased depending on the pump wavelength/s and pump power.

To achieve a broad and flat gain spectrum and a low noise figure it is known to use a plurality of pumps each with a discrete wavelength which utilise higher-order Raman pumping. First-order Raman pumping, as described above, is responsible for optical amplification of the WDM radiation through the pump to signal interaction. Second-order pumping is responsible for amplifying (through Stimulated Raman Scattering) the first-order pump by transferring optical power from pump to pump (pump to pump interaction) before amplifying wavelength channels of the VDM radiation. Higher-order pumping lowers the Noise Figure and enhances OSNR with very little effect on Double Raleigh Scattering (DRS). With a first-order Raman pumped amplifier the DRS gives a penalty on MPI (Multi-Path Interference) and hence OSNR. Raman amplifiers need to be capable of operating with different transmission fibre types, e.g. G.652-SSMF (Standard Single Mode Fibre), G.653-DSF (Dispersion Shift Fibre), G.655-NZ-DSF (Non Zero DSF), also with differing loss conditions and with different optical channel loading. Changes in optical attenuation over an optical fibre span can arise due to various causes: fibre bending (unavoidable when rolling out the fibre); fibre ageing that contributes to change the structure of the glass; tolerances on span length, temperature effects, and connector losses/splice losses. Channel loading along the link can vary due to the adding and dropping of optical channels thereby varying the number of channels to be amplified.

At present Raman amplifiers are often designed for optimum operation for an end of life (EOL) fibre span operation with additional margin being in built to allow operation on first deployment or beginning of Life (BOL). As a result Raman amplifier do not, at first deployment, operate at an optimal performance.

In addition to changes in fibre properties, the number of WDM wavelength channels (channel loading) in a system can vary over the operating life of the network, e.g. due to re-configurable optical add-drop multiplexer (ROADM). Typically they might initially start at BOL with a few channels (minimum 2 channels) and gradually increase in number and density until reaching a maximum capacity. Current Raman amplifiers are not able to maintain a flat gain spectrum as the number of wavelength channels changes.

Since legacy optical fibres have an unknown insertion loss, are of spans of differing lengths, are of different fibre types and have different channel loading, this requires a specific Raman amplifier module to be fabricated for optimum performance. Such Raman modules require an optical gain, and gain uniformity, that is optimised on a span by span basis, for different transmission fibre types and with different channel loading.

The present invention has arisen in an endeavour to provide a Raman amplifier that at least in part overcomes the limitations of the known Raman amplifiers.

According to the present invention there is provided a Raman amplifier for amplifying WDM radiation propagating along an optical fibre, said WDM radiation comprising a plurality of radiation components each having a selected waveband, the amplifier comprising: a plurality of optical radiation generating means operable to generate pump radiation of a selected wavelength and power, said radiation being coupled into said fibre to optically amplify the VVDM radiation, characterised by the optical radiation generating means being wavelength tuneable and means for measuring the power of the radiation components of the WDM radiation after it has propagated along the fibre and has been amplified, wherein the wavelength and power of operation of the wavelength generating means are controlled in dependence upon the measured powers such as to make the measured powers substantially equal in magnitude and of a selected magnitude.

Preferably the means for measuring the power of the radiation components is operable to measure the power of all radiation components comprising the WDM radiation.

Alternatively the means for measuring the power of the radiation components is operable to measure an average power over a number of radiation components for at least two groupings of components and wherein the wavelength and power of operation of the generating means are controlled in dependence upon the average powers such as to make the measured average powers substantially equal in magnitude For ease of fabrication the means for measuring the power of the radiation components includes a wavelength selective component for spatially separating the WDM radiation into the radiation components. Such a wavelength selective component can comprise a diffraction grating or an arrayed waveguide (AWG) device. The spatially separated radiation components are preferably arranged to be incident upon a respective photodiode.

To reduce polarisation dependent gain (PDG) each radiation generating means advantageously comprises a plurality of radiation sources, preferably three, each one being operable to generate radiation having the same wavelength but with a different state of polarisation (SOP). In a particularly preferred arrangement the three radiation sources are operable to generate radiation whose state of polarisation is shifted by 60° to each other and which are combined using a polarisation maintaining multiplexer. The use of a plurality of radiation sources having a SOP that is shifted reduces PDG without the need to co-polarise the WDM radiation components and pump radiation and is considered inventive in its own right.

Preferably the radiation generating means comprises a wavelength tuneable laser, such a laser diode or fibre laser.

The present invention finds particular application in WDM systems operating at C-band (1530 to 1560 nm) and at L-band (1570 to 1620 nm). When used for amplifying C-band WDM radiation the amplifier advantageously comprises at least two radiation generating means operating at selected wavelengths.

When used for amplifying L-band WDM radiation the amplifier advantageously comprises at least three radiation generating means operating at selected wavelengths.

Preferably the Raman amplifier is configured such that the pump radiation propagates in a direction that is counter to the direction of propagation of the WDM radiation. Alternatively it can be configured such that the pump radiation co-propagates with the WDM radiation or a combination of both co- and counter-propagating arrangements.

Figure 2:
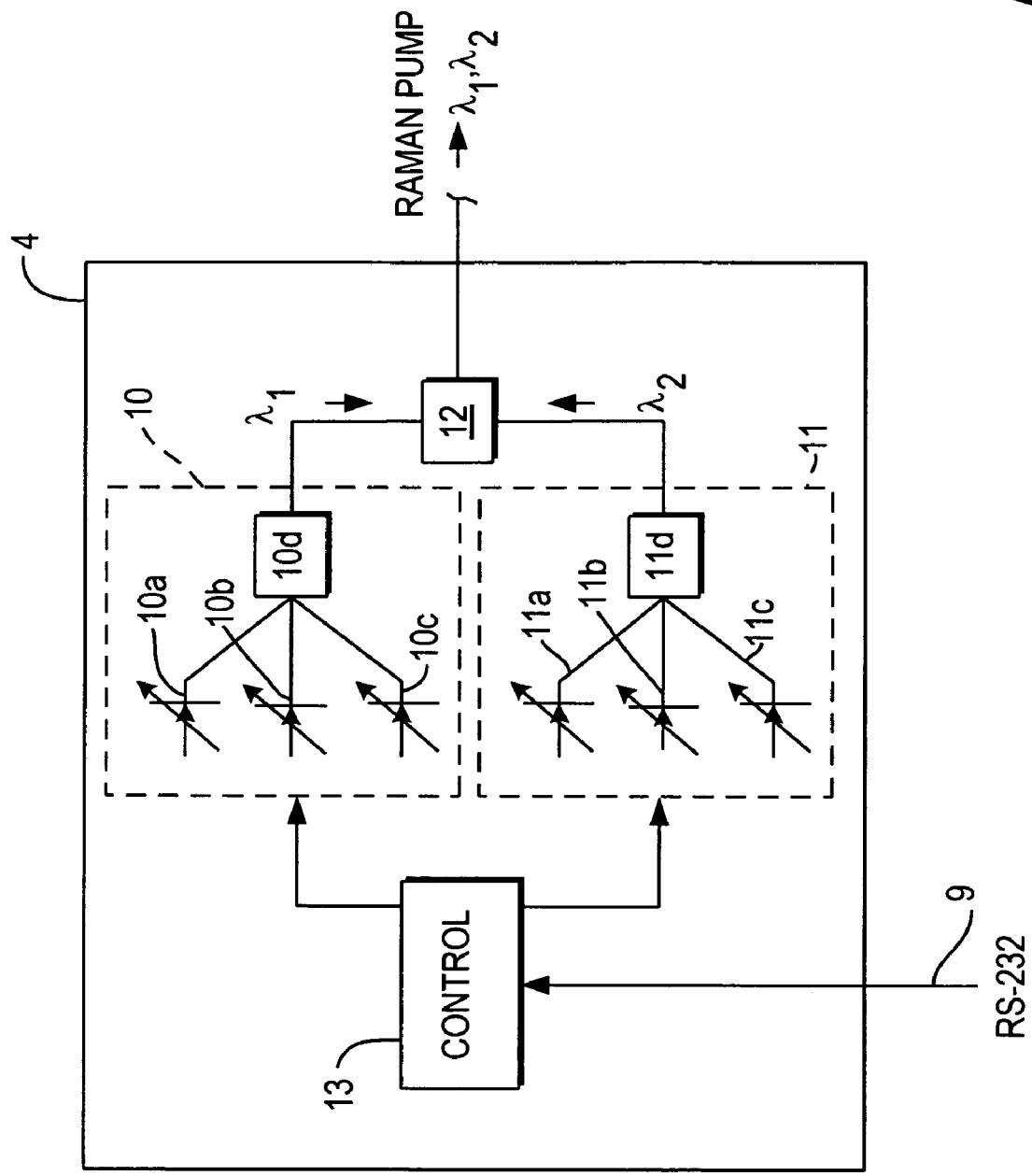

In order that the invention can be better understood a Raman amplifier embodying the invention will now be described, by way of example only, with reference to the accompanying drawings in which:

FIG. 1 is a schematic representation of a part of a DWDM telecommunication link including a Raman amplifier in accordance with the invention; and FIG. 2 is a schematic representation of the Raman amplifier module of FIG. 1.

Referring to FIG. 1 there is shown a schematic representation of part of a long haul DWDM (dense wavelength division multiplex) optical telecommunication link 1 including a Raman amplifier module 4 in accordance with the invention. The DWDM system is an 80 channel system with a wavelength (optical) channel spacing of 50 GHz operating within C-band (1520 to 1565 nm).

The DWDM communications link 1 comprises an optical transmitter 2 for generating and transmitting the DWDM radiation along a transmission optical fibre 3 to a receiver (not shown). The transmission fibre 3 might typically comprise a G.652-SSMF transmission fibre. At various points along the length of the link 1 between the transmitter 2 and receiver there is provided optical amplification, one such optical amplifier arrangement is shown in FIG. 1. For an ultra long haul link of over 3000 km between the transmitter and receiver amplification would typically be provided ten times, i.e. after transmission over approximately 300 kms of fibre (i.e. 60 dB of attenuation).

The amplifier arrangement illustrated comprises a Raman amplifier module 4, a WDM channel monitor 5, and an EDFA 6 (erbium doped fibre amplifier). The Raman amplifier module 4, which is the subject of the present invention, in essence operates as a pre-amplifier for the EDFA 6 and additionally provides power leveling of the wavelength channels to ensure efficient operation of the EDFA.

Pump optical radiation generated by the Raman amplifier module 4 is coupled into the transmission fibre 3 using a fused fibre coupler 7 from where it propagates along the fibre in a direction towards the transmitter 2, that is the pump radiation propagates in a direction which is counter to the direction of propagation of the WDM radiation being transmitted by the link. The coupler 7 is a broad band device and would typically be capable of coupling radiation over a wavelength range of 1400 to 1600 nm when used in a WDM system operating over C-band. The WDM channel monitor 5 is operable to measure the respective power of each of the 80 wavelength channels of the WDM radiation before it is input to the EDFA 6 (i.e. after being Raman amplified). An optical tap 8, typically a fused fibre coupler, is used to tap a small proportion, for example 5%, of the WDM radiation which is then input into the channel monitor 5.

WDM channel monitors are well known and typically include a wavelength dependent element, such an arrayed waveguide (AWG) device or diffraction grating, for spatially separating the WDM radiation into its constituent wavelength channels (radiation components) and directs each upon a respective photodiode of a photodiode array which measures its optical power. Alternatively the channel monitor can comprise a wavelength scanning device (spectrometer) which measures the powers of the various WDM wavelength channels sequentially.

The measured powers of the wavelength channels are communicated to the Raman module 4 by an RS-232 communications bus 9.

Referring to FIG. 2 there is shown a schematic representation of the Raman amplifier module 4. The Raman amplifier module 4 comprises two wavelength tuneable laser modules 10, 11, an optical coupler 12 for combining the Raman pump radiation generated by the laser modules and a laser module controller 12 for controlling operation of the laser modules 10, 11. Each laser module 10, 11 is operable to generate Raman pump radiation of a respective wavelength $\lambda_1$, $\lambda_2$ which is tuneable over a respective overlapping wavelength range (e.g. 1400 to 1455 nm and 1445 to 1600 nm). For example, to provide optical amplification to compensate for a maximum 35 dB transmission loss over a G.652-SSMF transmission fibre, the first laser module 10 could be operable to generate pump radiation of maximum power 600 mW at a reference wavelength $\lambda_1$=1438 nm and the second laser module operable to generate pump radiation of maximum power 600 mW at a reference wavelength $\lambda_2$=1455 nm.

Each wavelength tuneable laser module 10, 11 respectively comprises three wavelength tuneable lasers 10a to 10c, 11a to 11c and a polarisation multiplexer 10d, 11d. Each laser diode of a given laser module, under the control of the controller 13, is operable to generate radiation of the same wavelength and power but which has a state of polarisation which is shifted by 60°. The radiation output by each of the laser diodes of each module is combined by the respective polarisation multiplexer to provide the pump radiation output $\lambda_1$, $\lambda_2$ of the laser module which is coupled into the transmission fibre 3 by the broadband coupler 7. Typically the laser diodes can include a Peltier cell for maintaining the lasers at a constant temperature and an integrated photodiode for continuously monitoring the laser output power.

The laser module controller 13 is connected to the channel monitor by the RS-232 bus 9 and is operable to control both the wavelength and power of operation of each the laser diodes in dependence upon the powers of the various WDM wavelength channels as measured by the channel monitor 5.

In operation channel monitor 5 measures the power of each of the WDM wavelength channels and communicates these data values to the laser module controller 7 via the bus 9. The controller 7, in dependence upon these measured values, adjusts the operating wavelength and power of each of the laser modules such as to minimize any difference between the power of the wavelength channels and to set each to a selected value. Such operation of the Raman amplifier module enables the flatness of the gain spectrum to be automatically optimised for different transmission fibre types, with different number of wavelength channels and under different operating conditions. Typically the controller 7 includes a look-up table that contains the various laser drive currents (e.g. phase, gain, wavelength for a 3 stage sampled grating distributed feedback laser) required to achieve a desired Raman gain and the lasers are set according to these data.

As is known pump-to-pump interaction and Raman tilt (i.e. a slope in the Raman gain with wavelength) are major drawbacks of known Raman amplified system. However, in accordance with the Raman amplifier of the present invention, in which the pump wavelength is tuneable, the Raman tilt can be minimised over the operating WDM wavelength range. Since the pump wavelengths and power are automatically adjusted in response to the measured power levels, the amplifier module will be automatically optimised regardless of any changes in the number of wavelength channels (channel loading).

In the application described, in which the transmission fibre span length is very long (e.g. for lengths in excess of approximately 120 kms) and thus a high Raman gain is required, double Rayleigh scattering (DRS) is a dominant effect and this effect is minimised by using higher order Raman pumping (second-order in the embodiment described).

As is known polarisation dependent gain (PDG) generated by Raman amplification can be optimised if the Raman pump radiation and WDM radiation to be amplified are co-polarised along the transmission fibre. Such co-polarisation can give rise to an enhancement of Raman gain at least twice the mean value.

In the embodiment described in which the Raman pump radiation and WDM radiation counter-propagate along the transmission fibre, PDG is minimised by using three lasers for each Raman pump to generate pump radiation at the same wavelength having polarisation states shifted 60°. The use of three lasers having SOPs that are shifted by 60° to reduce PDG is considered inventive in its own right and can be applied equally to arrangements in which the Raman pump radiation is introduced into the fibre such that it co-propagates with the WDM radiation.

In alternative embodiments of the invention in which the Raman pump radiation co-propagates with the WDM radiation, each of the WDM channels has the same SOP (state of polarization) and the Raman pumps are advantageously co-polarised with the WDM channels.

It will be appreciated that the Raman amplifier of the present invention is not restricted to the specific embodiment described and that variations can be made that are within the scope of the invention. Depending on application, the Raman module can include further Raman pumps, utilising higher-order Raman amplification higher to improve gain flatness and OSNR. For example the present invention is equally suited for use in other WDM optical telecommunication networks with a different number of wavelength channels/spacing and in systems operating within other wavelength bands, such as those operating over L-band (1570 to 1620 nm). In a WDM system operating within the L-band it is preferred that the Raman laser module has at least three different wavelength pumps (third-order) in order to achieve an acceptable gain flatness.

Whilst the wavelength channel monitor has been described as comprising a respective photodiode to simultaneously measure the power of each wavelength channel a scanning spectrometer arrangement can be used to measure channel powers sequentially. Further in other arrangements the power for each wavelength channel need not be measured. For example, it is envisaged to measure the average power for a number of grouping of wavelength channels. The groupings are preferably non-overlapping in terms of wavelength and preferably encompass the entire WDM wavelength range of operation.

Furthermore whilst the Raman amplifier has been described as being a Distributed Raman Amplifier, in which optical amplification is distributed along the length of the transmission fibre, the present invention is equally suited to use in a discrete Raman amplifier that includes a length of optical fibre in which amplification takes place.

The Raman amplifier of the present invention provides advantages over known amplifiers in that it can automatically optimise its gain/gain flatness to adapt to different span lengths, different transmission fibres and different channel loadings.

The invention claimed is:

1. A Raman amplifier for amplifying wavelength division multiplexing (WDM) radiation propagating along an optical fiber, the WDM radiation including a plurality of radiation components each having a selected waveband and power, the amplifier comprising:

a) a plurality of optical radiation generating means operable for generating pump radiation of a selected wavelength and power, each optical radiation generating means including a plurality of radiation sources each being operable for generating radiation having the same wavelength but with a different state of polarization, the pump radiation being coupled into the fiber to optically amplify the WDM radiation, the optical radiation generating means being wavelength tuneable; and b) means for measuring the power of the radiation components of the WDM radiation after propagation along the fiber and after amplification to generate measured powers, the wavelength and the power of the optical radiation generating means being controlled in dependence upon the measured powers such as to make the measured powers substantially equal in magnitude and of a selected magnitude.

2. The amplifier according to claim 1, in which the means for measuring the power of the radiation components is operable to measure the power of all the radiation components comprising the WDM radiation.

3. The amplifier according to claim 1, in which the means for measuring the power of the radiation components is operable to measure an average power over a number of the radiation components for at least two groupings of the radiation components, and in which the wavelength and the power of the optical radiation generating means are controlled in dependence upon the average powers such as to make the average powers measured by the measuring means substantially equal in magnitude.

4. The amplifier according to claim 1, in which the means for measuring the power of the radiation components includes a wavelength selective component for spatially separating the WDM radiation into the radiation components.

5. The amplifier according to claim 4, in which the wavelength selective component comprises a diffraction grating.

6. The amplifier according to claim 4, in which the wavelength selective component comprises an arrayed waveguide device.

7. The amplifier according to claim 1, and comprising three radiation sources operable for generating radiation whose state of polarization is shifted by 60° to each other.

8. The amplifier according to claim 7, and further comprising a polarization maintaining multiplexer for combining the radiation from the radiation sources.

9. The amplifier according to claim 1, in which the radiation generating means comprises a wavelength tuneable laser.

10. The amplifier according to claim 1, in which the WDM radiation is C-band, and comprising at least two optical radiation generating means operating at selected wavelengths.

11. The amplifier according to claim 1, in which the WDM radiation is L-band, and comprising at least three optical radiation generating means operating at selected wavelengths.

* * * * *

UNITED STATES PATENT AND TRADEMARK OFFICE
CERTIFICATE OF CORRECTION

PATENT NO. : 7,170,672 B2
APPLICATION NO. : 10/529822
DATED : January 30, 2007
INVENTOR(S) : Fella et al.

It is certified that error appears in the above-identified patent and that said Letters Patent is hereby corrected as shown below:

Title Page, Item (73), under "Assignees", in Column 1, Line 3, delete "Conventry" and insert -- Coventry --, therefor.

Title Page, Item (30), under "Foreign Application Priority Data", in Column 1, Line 1, delete "MI2002A2079" and insert -- MI2002A002079 --, therefor.

Title Page, Item (56), under "U.S. PATENT DOCUMENTS", in Column 2, Line 2, delete "6,867,907 B1" and insert -- 6,867,907 B2 --, therefor.

Title Page, Item (56), under "U.S. PATENT DOCUMENTS", in Column 2, Line 3, delete "6,958,856 B1" and insert -- 6,958,856 B2 --, therefor.

In Column 2, Line 15, delete "VDM" and insert -- WDM --, therefor.

In Column 2, Lines 20-32, delete "Raman amplifiers need to be………..channels to be amplified." and insert the same in Line 21 as a new paragraph.

In Column 2, Line 66, delete "VVDM" and insert -- WDM --, therefor.

Signed and Sealed this

Fourteenth Day of October, 2008

JON W. DUDAS
*Director of the United States Patent and Trademark Office*